April 30, 1946.　　　C. H. JONES　　　2,399,352
GENERATOR AND MOTOR
Filed Aug. 7, 1944　　　2 Sheets-Sheet 1

INVENTOR
CECIL H. JONES
By Paul, Paul & Moore
ATTORNEYS

April 30, 1946.    C. H. JONES    2,399,352
GENERATOR AND MOTOR
Filed Aug. 7, 1944    2 Sheets-Sheet 2

INVENTOR
CECIL H. JONES
BY Paul, Paul & Moore
ATTORNEYS

UNITED STATES PATENT OFFICE 2,399,352

GENERATOR AND MOTOR

Cecil H. Jones, Mankato, Minn.

Application August 7, 1944, Serial No. 548,377

8 Claims. (Cl. 171—252)

This invention relates to new and useful improvements in generators and motors and more particularly to a novel means for securing the usual stator in the stator frame.

An important object of the present invention is to provide a simple and inexpensive clamping means for firmly securing the usual assembly of the stator laminations in the stator frame, whereby the stator may be quickly secured therein with a minimum of labor.

A further object of the invention is to provide a novel clamping means for securing a stator in its supporting stator frame which does not require the use of bolts or screws in the stator frame, nor in the usual end bells or bearing brackets of the completed stator frame, and whereby the clamping means for securing the stator in fixed position in the stator frame may be conveniently operated regardless of slight variations in the width of the assembled stator laminations.

A further and more specific object is to provide a stator securing means comprising a pair of annular clamping elements or washers arranged to be seated against opposite sides of the stacked stator laminations and one of which is adapted to be seated against an annular abutment shoulder provided in the bore of the stator frame, and a split clamping ring being provided at the opposite end of the stator and having a plurality of clamping screws therein for engaging the adjacent clamping washer of the stator, and means being removably mounted in the bore of the stator frame adapted to provide an abutment for the split clamping ring whereby when the clamping screws may be manipulated to securely clamp the stator between the annular shoulder and the split clamping ring.

Other objects of the invention reside in the novel construction of the clamping elements; in the means provided on the clamping ring for expanding the split lock ring into engagement with the bottom of its supporting groove, when the screws in the clamping ring are tightened to secure the stator in the stator frame; and in the provision of an extremely simple and inexpensive clamping mechanism for securing a stator in its supporting frame, which mechanism comprises a plurality of annular elements which may be readily manufactured in quantity production at very low cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
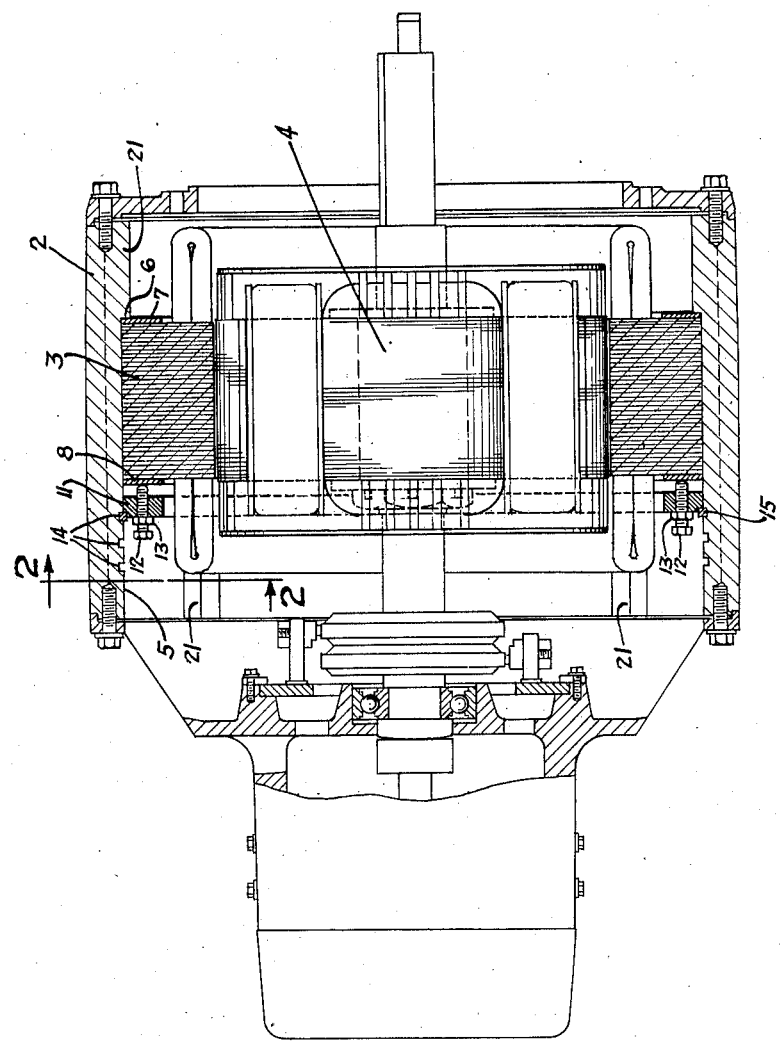
Figure 1 is a view showing a generator with my invention embodied therein one of the bearing brackets being detached.
Figure 2:
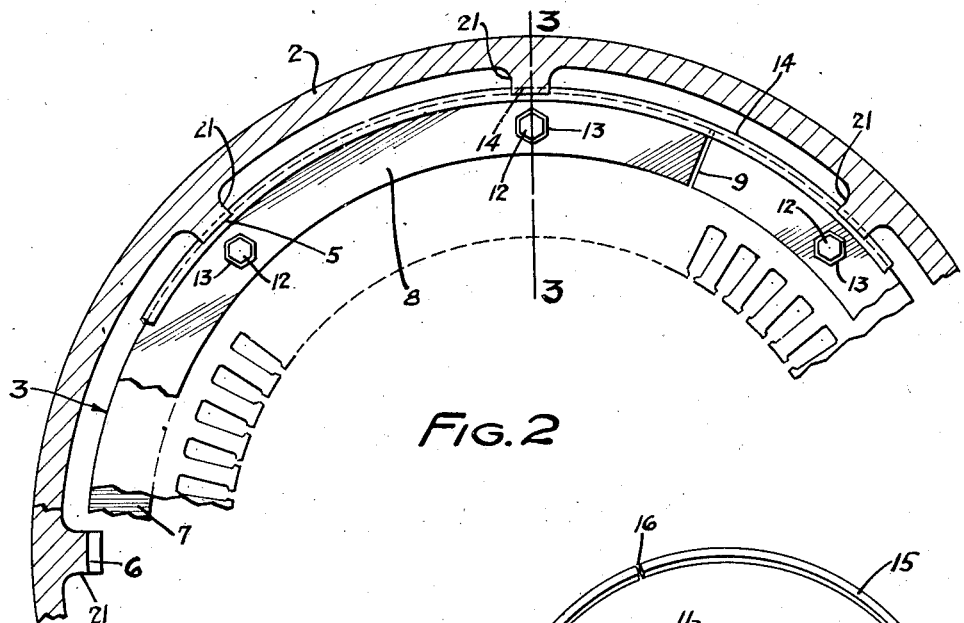
Figure 2 is an enlarged detail sectional view on the line 2—2 of Figure 1, showing the arrangement of the clamping elements when securing the stator in the stator frame.

In the selected embodiment of the invention herein disclosed, there is illustrated in Figure 1, for purposes of disclosure, a generator of more or less conventional design comprising the usual stator frame 2, stator 3 and the rotor 4.

An important feature of the present invention resides in the novel means provided for securing the completed stator 3 in the stator frame 2, whereby it may be quickly and accurately positioned therein and secured in fixed relation in the stator frame with a minimum of time and labor.

Figure 3:
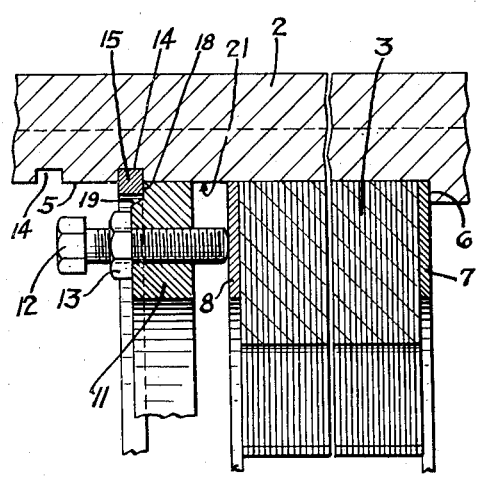
Figure 3 is an enlarged detail sectional view on the line 3—3 of Figure 2.

As best shown in Figures 1 and 3, the stator frame 2 is provided with the usual bore 5 which extends inwardly from one end of the stator frame and terminates at its inner end in an annular shoulder 6, which provides an abutment for one end of the stator 3. To distribute the clamping pressure exerted against the stator laminations by the novel clamping means herein disclosed, over relatively greater areas of the stacked laminations, I propose to utilize a pair of annular clamping washers or elements 7 and 8, which are preferably alike in construction and may be split as shown at 9 in Figure 4. One of these clamping washers is first fitted into the bore 5 of the stator frame and is seated against the annular shoulder 6, after which the assembled stator is inserted into the bore 5 of the stator frame with one end of its laminated core seated against the clamping washer 7, as clearly illustrated in Figures 1 and 3.

After the stator has thus been inserted into the stator frame with one end seated against the washer 7, the second clamping washer 8 is inserted into the bore and seated against the adjacent end of the stator 3, as shown.

An annular clamping ring, generally designated by the numeral 11, is next fitted into the bore 5 to a position adjacent to the clamping washer 8. The clamping ring 8 carries a plurality of equi-spaced clamping screws 12 which are received in threaded sockets therein, and each preferably has a lock nut 13 for securing the screws 12 against working loose as a result of vibration, when the generator is in operation.

Figure 4:
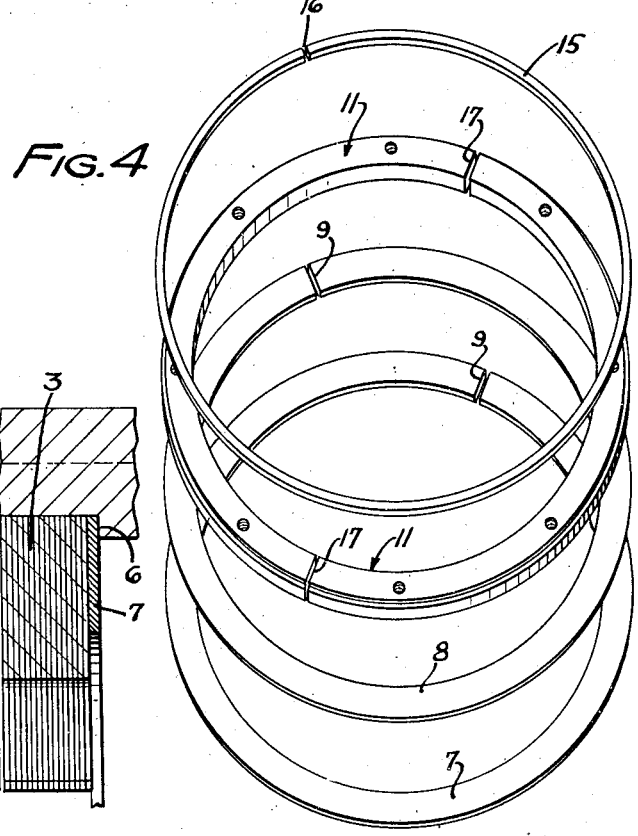
Figure 4 is a perspective view showing the various annular elements required in the construction of my novel clamping means.

To provide as abutment for the clamping ring 11, an annular groove 14 is cut in the wall of the bore 5 as shown in Figures 1 and 3, adapted to receive an expansion lock ring 15, which is split as shown at 16 in Figure 4.

The clamping ring 11 is preferably split at diametrically opposite points, as indicated at 17 in Figure 4, thereby to facilitate mounting it in position between the stator washer 8 and the expansion lock ring 15, as will be understood by reference to Figure 3.

Means is provided on the clamping ring 11 for retaining the lock ring 15 in proper position in the groove 14, when the clamping screws 12 are manipulated to removably secure the stator against the shoulder 6. Such means is shown comprising an annular recess 18 cut in the outer corner of the clamping ring 11. The bottom of the recess 18 is parallel to the adjacent side face or wall of the lock ring 15 whereby it may firmly seat thereagainst. The other wall 19 of the recess 18 is preferably inwardly tapered or inclined whereby when the clamping screws are initially manipulated to secure the stator in the stator frame, and the clamping ring 11 is backed up against the lock ring 15, the inclined face 19 may engage the adjacent corner of the lock ring and thereby positively expand the lock ring into the bottom of the groove 14.

The inclined face 19 of the lock ring 15 thus eliminates any possible danger of the lock ring becoming disengaged from any portion of the groove 14 during the manipulation of the clamping screws 12 to secure the stator in the stator frame, and also whereby the lock ring becomes immovably secured in the groove 14 so long as the stator is fixedly secured in the stator frame by the clamping action of the screws 12.

By the employment of the novel clamping means herein disclosed the operation of securing the assembled stator in the stator frame is greatly facilitated. Its construction is such that variations in the width of the stator will have no effect upon the clamping action of the clamping means. This will readily be understood by reference to Figure 3 wherein it will be noted that the clamping ring 11 is normally spaced from the adjacent clamping washer 8, and the clamping screws 12 are of such length as to allow for maximum variations which may occur in the length of the stator in the construction thereof.

If desired, a plurality of annular grooves 14 may be cut in the wall of the bore 5, as shown in Figure 1, whereby stators of various lengths may be secured in the stator frame with the same clamping means and whereby different K. W. or H. P. ratings may be obtained with a given size stator frame. This cuts down manufacturing costs as it eliminates having to carry in stock many frame sizes to meet slight changes in specified generator or motor ratings, as will readily be understood.

The lock nuts 13 on the clamping screws 12 provide means for positively locking the screws in operative position whereby there is little or no danger of said screws working loose as a result of vibration, when the generator is in operation.

Actual experience has proven that by the employment of the novel clamping means herein disclosed for removably securing a stator in its supporting frame, the operation of assembling generators and motors so equipped is greatly facilitated and with less labor and therefore a reduction in cost. The various parts of the clamping mechanisms are extremely simple and inexpensive to construct as will readily be understood by reference to Figure 4.

From the foregoing it will be noted that the entire stator assembly is removably supported in the stator frame in such a manner that it may be quickly removed therefrom when necessary, which is a very desirable feature. It will also be noted that I have herein referred to the stator frame as having a bore therein. Stator frames of this general type are usually provided with longitudinally extending inwardly facing ribs, indicated at 21 in the drawings to provide air circulating passages between the stator and the usual outer wall of the machine frame. The inner faces of these ribs are machined by a boring operation to receive the stator, and such boring constitutes in effect, a bore, as herein implied.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an electric apparatus of the class described comprising a stator frame having a bore therein terminating at one end in a suitable abutment, an annular groove in said bore disposed in spaced relation to the abutment, a unitary stator assembly fitted into said bore and positioned between said abutment and groove with one end seated against the abutment, an annular lock ring fitted into said groove and having a portion thereof projecting into the bore, and clamping means engageable with the lock ring and the adjacent end of the stator and cooperating with said abutment to firmly secure the stator in the stator frame, said clamping means being capable of manipulation to firmly secure the stator assembly in the stator frame regardless of variations in the axial length thereof.

2. In an electric apparatus of the class described comprising a stator frame having a bore therein terminating at one end of an abutment shoulder, an annular groove in said bore disposed in spaced relation to the shoulder, a unitary stator assembly fitted into said bore and positioned between said shoulder and groove with one end seated against the shoulder, an annular lock ring fitted into said groove and having a portion thereof projecting into the bore, a clamping washer seated against the end of the stator adjacent to said groove, and clamping means interposed between the lock ring and said washer and cooperating with said shoulder to firmly secure the stator in the stator frame.

3. In an electric apparatus of the class described comprising a stator frame having a bore therein terminating at one end in an abutment shoulder, a unitary stator assembly fitted into said bore with one end engaging the shoulder, abutment means removably secured in said bore at the opposite side of the stator, a clamping ring seated against said abutment means on the side thereof facing the stator, and a plurality of clamping elements mounted in the clamping ring and having their inner ends operatively engaged with the stator whereby said clamping elements may be operated to firmly secure the stator in the stator frame between said shoulder and abutment means.

4. In an electric apparatus of the class described comprising a stator frame having a bore therein terminating at one end in an abutment shoulder, an annular groove in said bore disposed in spaced relation to said shoulder, a unitary stator assembly fitted into said bore and positioned between said shoulder and groove with one end engaging the shoulder, a split lock ring fitted into and against the bottom of said groove and having a portion thereof projecting into the bore, a split clamping ring seated against the lock ring on the side thereof facing the stator, and a plurality of clamping elements mounted in the clamping ring and having their inner ends operatively engaged with the stator whereby said clamping elements may be operated to firmly secure the stator against the shoulder in the stator frame.

5. In an electric apparatus of the class described comprising a stator frame having a bore therein terminating at one end in an abutment shoulder, an annular groove in said bore disposed in spaced relation to said shoulder, a unitary stator assembly fitted into said bore and positioned between said shoulder and groove with one end engaging the shoulder, a split lock ring fitted into and against the bottom of said groove and having a portion thereof projecting into the bore, a split clamping ring seated against the lock ring on the side thereof facing the stator, and a plurality of clamping elements mounted in the clamping ring and having their inner ends operatively engaged with the stator and cooperating with said shoulders to firmly secure the stator in the stator frame.

6. In an electric apparatus of the class described comprising a stator frame having a bore therein terminating at one end in an abutment shoulder, an annular groove in said bore disposed in spaced relation to the shoulder, a unitary stator assembly fitted into the bore and having one end seated against said shoulder, a split lock ring fitted into said groove and having a portion thereof projecting into the bore, a split clamping ring interposed between the lock ring and the stator, a plurality of clamping screws carried by the clamping ring and operatively engaged with the adjacent end of the stator, whereby manipulation of said screws will firmly secure the stator in the stator frame, and means on the clamping ring for expanding the lock ring into said groove.

7. In an electric apparatus of the class described comprising a stator frame having a bore therein terminating at one end in an abutment shoulder, an annular groove in said bore disposed in spaced relation to the shoulder, a unitary stator assembly fitted into the bore and having one end seated against the shoulder, a lock ring fitted into said groove and having a portion thereof projecting into the bore, a split clamping ring interposed between the lock ring and the stator, a plurality of clamping screws carried by the clamping ring and engageable with the adjacent clamping element whereby manipulation of said screws will firmly secure the stator in the stator frame, and cam means on the clamping ring engageable with a portion of said lock ring for expanding the lock ring into said groove and positively retaining it therein when the clamping screws are actuated to secure the stator in the stator frame.

8. In an electric apparatus of the class described comprising a stator frame having a bore therein terminating at one end in an abutment shoulder, an annular groove in said bore disposed in spaced relation to said shoulder, an annular split clamping element fitted into said bore and seated against said shoulder, a unitary stator assembly fitted into the bore and having one end seated against said clamping element, a second clamping element seated against the opposite end of the stator, a split lock ring fitted into said groove and having a portion thereof projecting into the bore, a split clamping ring interposed between said lock ring and the adjacent clamping element, and a plurality of clamping screws carried by the clamping ring and engageable with the adjacent clamping element, whereby when said screws are manipulated in one direction, they will secure the stator in fixed relation against the shoulder in the stator frame.

CECIL H. JONES.